May 17, 1932. G. RAPSCH 1,858,641
LAWN RAKE
Filed Sept. 21, 1931
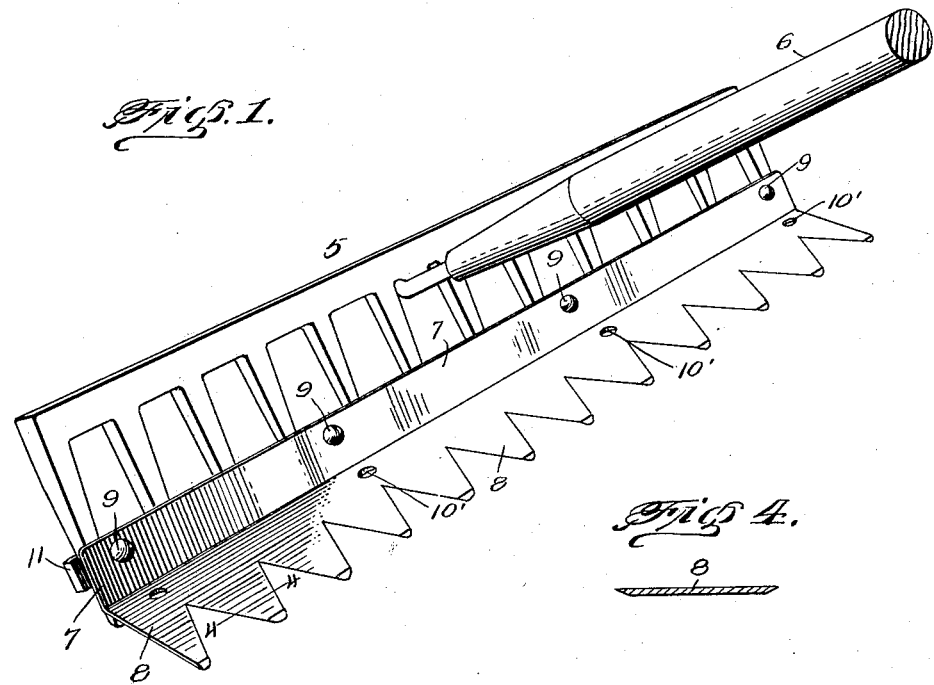
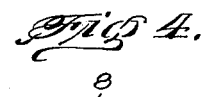
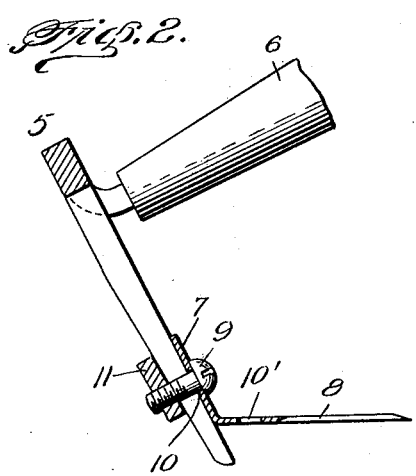
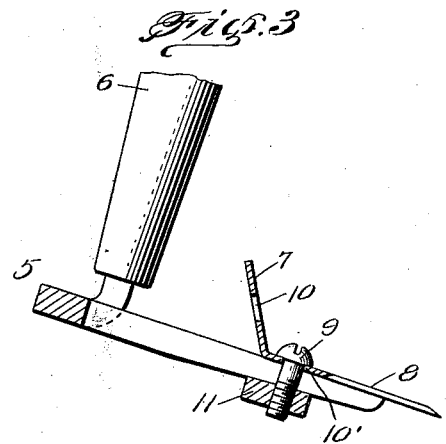
Inventor
Gustav Rapsch,
By Davis & Davis
Attorneys Patented May 17, 1932

1,858,641

UNITED STATES PATENT OFFICE

GUSTAV RAPSCH, OF GREAT NECK, NEW YORK

LAWN RAKE

Application filed September 21, 1931. Serial No. 564,162.

The object of this invention is to provide a simple attachment for a lawn rake that may be used to destroy what is generally known as creep grass. This grass makes its appearance about the beginning of June each year and then seeds until September; then it dies out as it is only a one-year plant. The seeds, however, germinate the following year. If the "runners" of this grass are cut it is impossible to form seeds. It is the object of this attachment to enable the runners to be easily and efficiently cut by an operation similar to that of raking a lawn. Wherever this grass is found no other grass can grow as it smothers out the other grass, hence the value of a simple implement that will enable this grass to be destroyed in a lawn where the lawn type of grass is desired.

Referring to the drawings annexed:

Fig. 1 is a perspective view of an ordinary rake with my attachment applied thereto.

Fig. 2 is a vertical sectional view thereof.

Fig. 3 is a view similar to Fig. 2 with the attachment set in another position; and Fig. 4 is a sectional view taken on the line 4—4 of Fig. 1.

Referring to these drawings by reference characters, 5 designates a common form of lawn rake provided with the usual handle 6. My attachment is bolted on the face of the teeth of the rake near the working extremities thereof. The attachment consists of a single blade of sheet steel bent longitudinally to form an attaching flange 7 and a cutter bar or plate 8, the latter being provided with V-shaped teeth having cutting edges. These two plates 7 and 8 stand at obtuse angles to each other so that when the flange 7 is bolted against the face of the teeth of the rake and the rake handle is held in the usual inclined position for raking purposes, the cutter bar 8 will project forwardly from the front of the teeth in a substantially horizontal position. The flange 7 is secured to the teeth by means of a series of bolts 9 which pass through holes 10 in the flange and between the teeth, and these bolts are tapped into a clamping bar 11 which is held through the medium of the bolts against the rear faces of the teeth. This bar extends the full width of the rake.

In this way the cutter bar 8 may be vertically adjusted on the rake teeth so as to position the cutter at the desired point above the lower extremities of the rake teeth, so that the loops of the creep grass may be cut by operating the rake in the usual manner of a rake and without injuring the lawn grass proper. As the rake is operated in the usual manner the loops in the creep grass are caught by the forwardly projecting cutters and severed in several places, so that it will be impossible for the creep grass to develop seed, thereby preventing the creep grass recurring the following season.

I provide the cutter bar 8 with a series of holes 10' which are companions to the holes 10, these holes being located near the fold in the sheet metal plate. This extra series of holes enables the attachment to be secured to the rake with the flat cutter bar 8 lying against the face of the teeth, as shown in Fig. 3. When adjusted in this manner the cutter bar lies parallel to the face of the rake teeth. This adjustment of the attachment is especially desired where the operator of the rake prefers to stand in a more upright position than is possible with the adjustment shown in Fig. 1. This adaptation may also be used for other gardening purposes such for instance as a light chopping hoe. It will be understood that the edges of the V-shaped teeth are sharpened by bevelling and that these teeth may be resharpened from time to time to keep the implement in good working order.

I claim:

A lawn rake attachment embodying a plate having two members lying at an obtuse angle to each other, one plate forming a fastening flange adapted to lie against the teeth of the rake and being provided with bolt-holes and the other plate being provided with forwardly projecting sharpened V-shaped teeth, and means for adjustably clamping the aforesaid clamp plate to the face of the teeth.

In testimony whereof I hereunto affix my signature.

GUSTAV RAPSCH.